April 16, 1968  D. H. MOONEY, JR., ET AL  3,378,835

SECTORIZATION FOR APERTURE ADDED RADARS

Filed Nov. 17, 1966  2 Sheets-Sheet 1

David H. Mooney Jr.
Spencer D. Coleman Jr.,
INVENTORS.

April 16, 1968  D. H. MOONEY, JR., ET AL  3,378,835
SECTORIZATION FOR APERTURE ADDED RADARS Filed Nov. 17, 1966  2 Sheets-Sheet 2

David H. Mooney Jr.
Spencer D. Coleman Jr.,
INVENTORS.

BY *Harry M. Saragovitz*
*Edward J. Kelly*
*Herbert Berl*
*Robert E. Lence*

United States Patent Office 3,378,835
Patented Apr. 16, 1968

3,378,835
SECTORIZATION FOR APERTURE
ADDED RADARS
David H. Mooney, Jr., and Spencer D. Coleman, Jr.,
Severna Park, Md., assignors, by mesne assignments, to
the United States of America as represented by the
Secretary of the Army
Filed Nov. 17, 1966, Ser. No. 596,048
10 Claims. (Cl. 343—5)

ABSTRACT OF THE DISCLOSURE

A plurality of radar vehicle units each having back-to-back antennas mounted on a common rotating pedestal are provided. The antennas of all the radar units rotate in azimuth synchronization and alignment. The antennas are paired off by antenna switching so that each pair searches a different portion of the hemisphere and will combine their information by aperture adding.

---

Where detection range is a critical item, there is a need to sectorize the radar units of a radar complex. This is the case for radar applications such as ballistic missile detection. There is a further need for an arrangement which will permit the range performance of the complex to be extended by the use of more and more radars in the system. In the field there is a need for a radar scheme which permits flexibility and improved performance as the importance of the defended position or the logistics problem permits.

The present invention provides a system for diverse use of a plurality of radar vehicle units. Each radar vehicle unit has back-to-back antennas mounted on a common rotating pedestal. The two antenna faces are never used simultaneously, but can be switched in synchronism with the rotation, once each 180° of motion. As is the required condition for aperture adding, the antennas of all the radars in the complex rotate in azimuth synchronization and alignment. Either one radar or two radars can be operated over a full 360°, or can be operated only over 180° by the antenna switching. A third, or third and fourth radar vehicle units can be added to give coverage over the remaining 180° if desired. The result is a range of coverage and range performance which permits great flexibility to the field commander as conditions warrant.

It is an object of the invention to provide a suitable search sectorization of radar units used in an aperture added scheme.

A further object of the present invention is to provide for diverse use of a plurality of radar vehicle units.

A still further object of this invention is to provide an arrangement which permits the range performance of a radar complex to be extended by the use of more and more radars in the system.

The invention further resides in and is characterized by various novel features of construction, combinations, and arrangements of parts which are pointed out with particularity in the claims annexed to and forming a part of this specification. Complete understanding of the invention and an introduction to other objects and features not specifically mentioned will be apparent to those skilled in the art to which it pertains when reference is made to the following detailed description of a specific embodiment thereof and read in conjunction with the appended drawing. The drawing, which forms a part of the specification, presents the same reference characters to represent corresponding and like parts throughout the drawing, and wherein:

Figure 1:
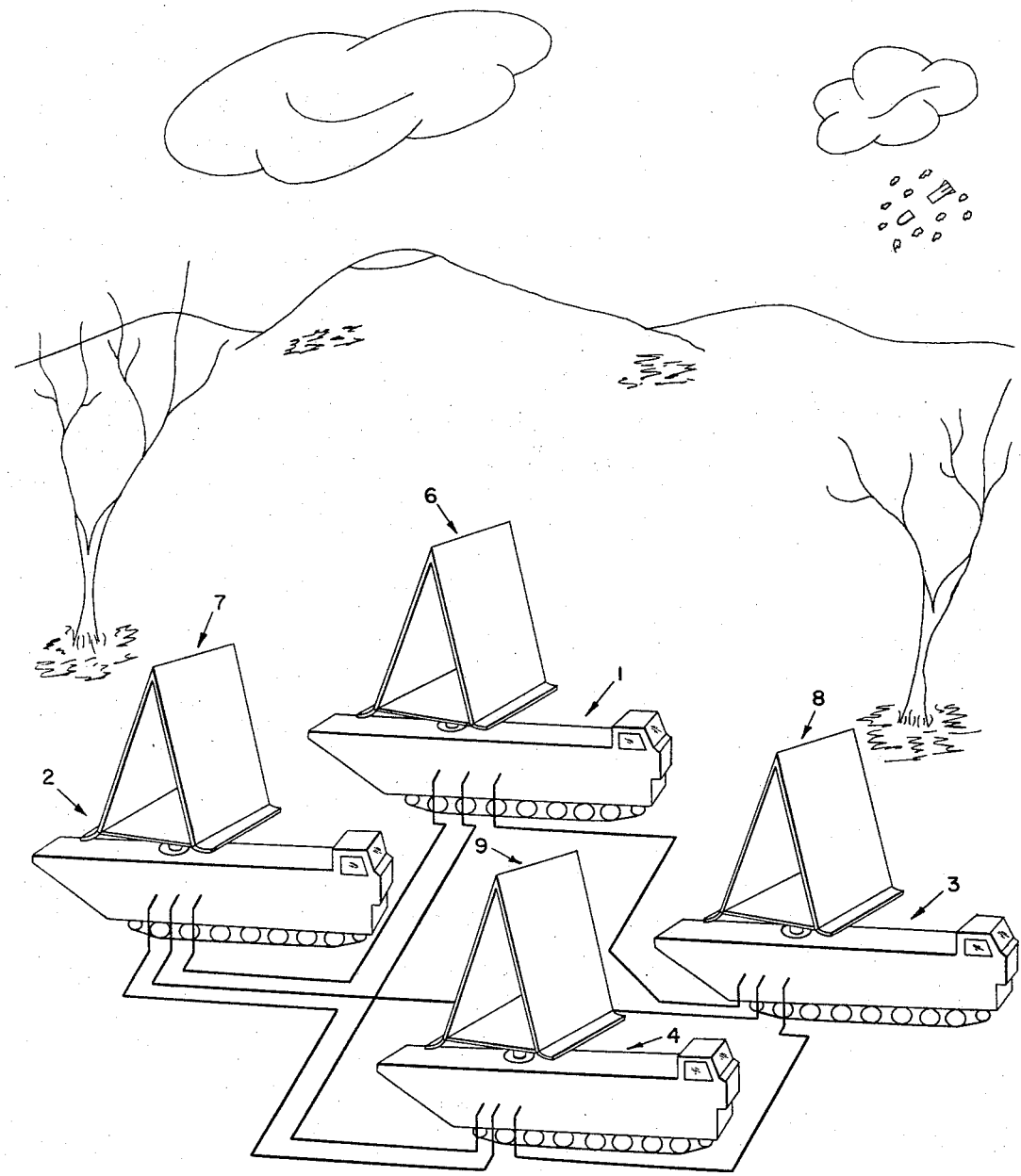
FIGURE 1 is a diagrammatic representation of the overall search radar complex in which the invention is used.

Aperture adding is a technique disclosed by P. H. Pincoffs in his patent issued on Dec. 15, 1964, having Patent No. 3,161,870. This technique requires that the data from two or more radars be combined in each radar and processed thereby. Each of the radars will radiate at a different frequency, but each has receivers to receive all of the frequencies. This technique gives an improved range performance for a given transmitter power. The overall search radar complex is shown in FIGURE 1. The primary function of the search radar complex is the initial detection of an approaching target complex (consisting of the warhead, last stage rocket, the accompanying fragments, plus any decoys). The system normally consists of identical search radar vehicles 1 and 2 having their antennas 6 and 7 mounted for rotation. However, if 360° coverage at maximum detection range is needed then four radar vehicles may be used. The additional search radar vehicles 3 and 4 having antennas 8 and 9 are also shown in FIGURE 1. The vehicles are located several hundred feet apart and are interconnected by low frequency cable for exchange of data. These radar vehicles act as a team under normal circumstances, however, when desired or necessary, a lesser number can perform all the search functions with reduced range performance. This arrangement provides the highly desirable feature of slow death.

Figure 2:
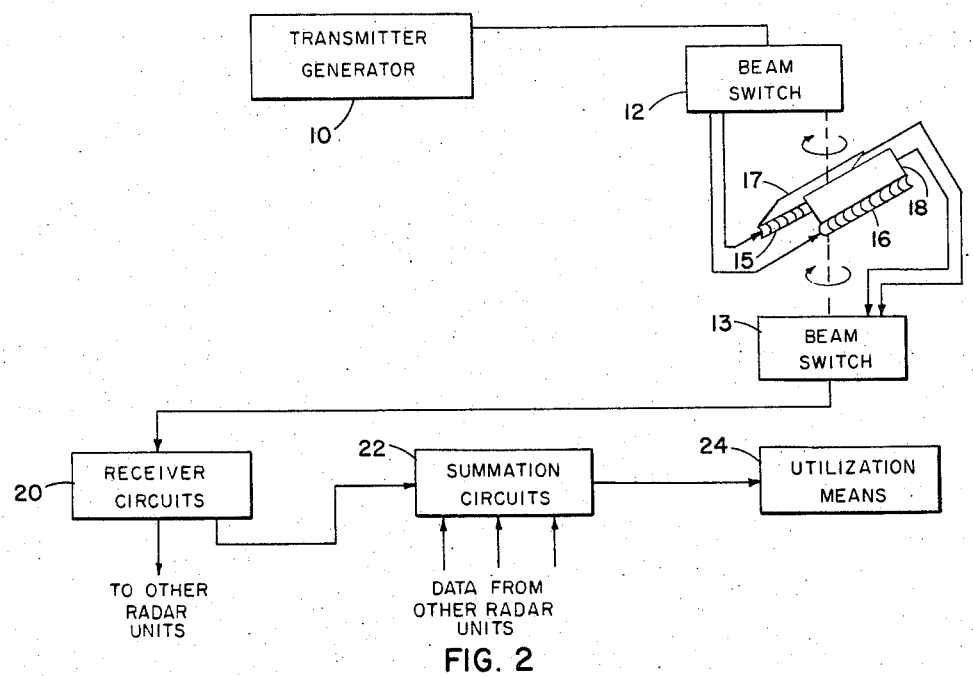
FIGURE 2 shows a block diagram illustrating a basic electric system used in each of the radar vehicle units.

A block diagram of the basic electric system used in each of the radar vehicle units is shown in FIGURE 2. The transmitter generator 10 for each unit is a coherent master-oscillator power amplifier type, incorporating a phase-coded pulse compression transmission. Also, pulse-to-pulse frequency hopping is provided by the transmitter. The pulse repetition frequency is kept low enough so that true range is obtained directly, and the pulse width is sufficiently great so that Doppler can be obtained from a single pulse return. The specific details of the transmitter generator may be found in my copending application Ser. No. 576,524, filed Aug. 30, 1966.

Beam switches 12 and 13 are mounted on the antenna of the vehicle units. The antenna is really four separate array antennas 15–18. Two of them, 15 and 16 being transmitting antennas, and the other two 17 and 18 being the receiving antennas. A fan beam having its thin direction in azimuth is transmitted by 15 or 16. As the antenna is rotated mechanically, beam switch 12 will alternately connect the output of the generator 10 to the transmitting antennas. Beam switch 12, when it is made operative, will change connections every 180° of azimuth. By so doing this allows scanning of 180° of the horizon by one unit without the need of oscillating the antenna or of having the scan time be discontinuous. If whole horizon scan by the unit is desired, the beam switch can be made inoperative so that it will not switch. Therefore, only one transmitting antenna will be connected to the generator and it will transmit for the full 360°. The same operation is had by beam switch 13 with respect to the returns from receiver antennas 17 and 18. Beam switch 13 will switch in synchronization with switch 12. Also, the operator will make both beam switches be either "on" or "off" at the same time, and the operator will set the beam switches in accordance to which half of the horizon he wants the unit to search.

The returns from the receivers are fed selectively to receiver circuits 20 where target data is determined. The receiver circuits have a plurality of outputs: one for each of the other radar vehicle units and one for the summation circuits 22. The summation circuits have inputs from the receiver circuits of each of the other units and will sum the data of the units which are searching the same portion of the horizon. The output of summation circuits 22 is fed to a utilization means 24 such as a central computer of the radar complex.

Figure 3:
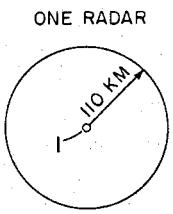
FIGURE 3 shows the possible coverage one radar vehicle unit can have by the use of the present invention.

With one radar vehicle unit of this type a small amount of versatility may be had. This is shown in FIGURE 3. The range indicated is for 99% probability of detection on a 0.05 m.$^2$ target area. With a back-to-back radar unit the field operator can be making the beam switches inoperative cover 360° of the horizon. This is shown by the top circle which indicates a maximum range of 110 km. for any one radar unit of this specific embodiment. However the range can be increased to 130 km. if the beam switch is made operative, and the radar unit will only cover 180° of the horizon. Any 180° of the horizon may be covered by proper settings of the switching means. This increase in range is possible because range performance of a search radar is inversely proportional to the fourth root of scan volume.

Figure 5:
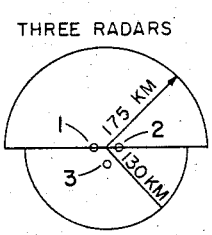
FIGURE 5 is a representation of the possible coverage by three radar vehicle units used according to this invention.
Figure 4:
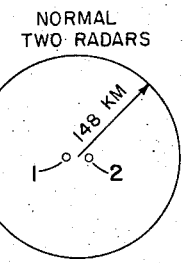
FIGURE 4 is a illustration of the possible coverage by two radar vehicle units used in accordance with the present invention.

Much greater performance and versatility can be had with the use of two radar vehicle units. The upper circle of FIGURE 4 shows the increase in the range performance for the same target (148 km. as compared to the 110 km. of a single unit) obtained by two units using the principles of aperture adding. The beam switches are made inoperative for the 360° horizon coverage. If the beam switches are made operative together, then the further increase in range performance shown in FIGURE 4 can be obtained. This result of 175 km. detection range with use of units 1 and 2 can be supplemented by a third unit 3 as shown in FIGURE 5. Radar unit 3 will have its beam switch activated 180° out of phase with respect to the beam switches of units 1 and 2. This will allow units 1 and 2 to be used to cover the half of the horizon which a target is most likely to appear, while unit 3 covers the other half of the horizon. Coverage of the whole horizon at the 175 km. detection range can be obtained by the use of four radar vehicle units by adding unit 4 in the complex. Units 3 and 4 have their beam switches 180° out of phase with the beam switches of units 1 and 2. This provides the full horizon coverage as indicated in FIGURE 6.

Figure 6:
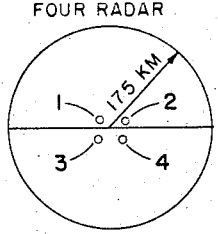
FIGURE 6 shows the possible coverage four radar vehicle units can have by the use of the present invention.

Any number of units can be used to give even better range detection performance by following the scheme of FIGURE 5 and FIGURE 6. In other words if five units were to be used then unit five would be aperture added to units 1 and 2 of FIGURE 6. This would give a range detection shape like that of FIGURE 5, with, of course, larger ranges. Likewise, if a sixth unit were to be used, it would be aperture added with units 3 and 4. This would give a circle range shape like that of FIGURE 6. This pattern is repeated as more radar units are added.

By the use of this invention the amount of desired hemispherical coverage around the defended area can be provided with one or more radar units. At the option of the field commander, any half hemisphere can be covered alone if desired; again with one or more units. Although not shown in the drawings, any number of units could be aperture added to the half horizon coverage shown in FIGURE 4. Each additional radar unit will increase the range detection. The smaller angular coverage, of course, results in improved range performance, which in certain tactical situations will be useful. Also unequal full hemisphere coverage can be selected by the operator, as under normal circumstances all the radar units will be operating to cover half horizon, and more units can be assigned to one half of the horizon than to the other. This permits flexibility and improved performance by assignment of the operator as the importance of the defended position or the logistics problem permits.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated. It will be apparent to those skilled in the art that changes may be made in the form of the apparatus disclosed without departing from the spirit of the invention as set forth in the disclosure, and that in some cases certain features of the invention may sometimes be used to advantage without a corresponding use of other features. It is, therefore, to be understood that within the scope of the appended claims, the invention may be practiced otherwise than as specifically described. Accordingly, it is desired that the scope of the invention be limited only by the appended claims.

We claim:

1. A search radar sysem having a plurality of radar units, each unit having switching means therein, said switching means being adapted and connected in the unit so as to cause its radar unit to search only a predetermined portion of the hemisphere, the switching means of a first two radar units being synchronized whereby said two units will search a first portion of the hemisphere at the same time, the switching means of any remaining radar units being synchronized to cause these units to search a second predetermined portion of the hemisphere at the same time, and combining means connected to said radar units for combining data generated by radar units which have their switching means synchronized.

2. A search radar system as set forth in claim 1, wherein the switching means of each of the units can cause its unit to search either of said first and second portions.

3. A search radar system as set forth in claim 2, wherein said plurality of radar units are three in number, said first portion of the hemisphere being of greater importance than said second portion of the hemisphere.

4. A search radar system as set forth in claim 2, wherein said plurality of radar units are four in number; further radar units connected in the search radar system, half of said further radar units having their switching means synchronized with said first two radar units, and the remaining of said further radar units having their switching means synchronized with said radar units searching said second portion of the hemisphere.

5. A search radar system as set forth in claim 4, wherein said further radar units are in number an odd number, and the extra further radar unit has its switching means synchronized with the radar units searching the portion of the hemisphere which has the greater importance.

6. A search radar system as set forth in claim 1, wherein said radar units each have two back-to-back antennas which are rotated continuously in one direction in azimuth, said switching means being connected to said antennas so as to allow only one antenna to be activated at any given time, and said switching means being adapted to alternate which antenna is activated every 180° of rotation in azimuth, whereby a select half of the horizon can be searched by each radar unit.

7. A search radar system as set forth in claim 6, wherein said first and second portions together cover the whole horizon, and each portion covering a different half of the horizon.

8. A search radar system as set forth in claim 7, wherein the antennas of all the units rotate in azimuth synchronization and alignment.

9. A search radar system as set forth in claim 8, wherein said plurality of radar units are three in number, said first portion of the hemisphere being of greater importance than said second portion of the hemisphere.

10. A search radar system as set forth in claim 8, wherein said plurality of radar units are four in number; further radar units connected in the search radar system, half of said further radar units having their switching means synchronized with said first two radar units, and the remaining of said further radar units having their switching means synchronized with said radar units searching said second portion of the hemisphere.

No references cited.

RODNEY D. BENNETT, *Primary Examiner.*

C. L. WHITHAM, *Assistant Examiner.*